US010397503B2

(12) United States Patent
Malinge et al.

(10) Patent No.: US 10,397,503 B2
(45) Date of Patent: Aug. 27, 2019

(54) IMAGE SENSOR WITH HIGH DYNAMIC RANGE

(71) Applicant: STMicroelectronics (Crolles 2) SAS, Crolles (FR)

(72) Inventors: Pierre Emmanuel Marie Malinge, La Tessoualle (FR); Frederic Lalanne, Bernin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 233 days.

(21) Appl. No.: 15/376,792

(22) Filed: Dec. 13, 2016

(65) Prior Publication Data

US 2018/0167567 A1 Jun. 14, 2018

(51) Int. Cl.

*H04N 5/359* (2011.01)
*H04N 5/355* (2011.01)
*H04N 5/3745* (2011.01)

(52) U.S. Cl.

CPC ....... *H04N 5/3591* (2013.01); *H04N 5/35554* (2013.01); *H04N 5/37452* (2013.01)

(58) Field of Classification Search

CPC ............. H04N 5/3591; H04N 5/37452; H04N 5/35554

See application file for complete search history.

(56) References Cited

U.S. PATENT DOCUMENTS

2007/0046797 A1* 3/2007 Kakumoto ............ H04N 5/335 348/294
2015/0350584 A1* 12/2015 Fenigstein ............ H04N 5/355 250/208.1
2016/0005785 A1 1/2016 Barbier et al.
2017/0366766 A1* 12/2017 Geurts ................ H04N 5/3532

* cited by examiner

*Primary Examiner* — Mekonnen D Dagnew
(74) *Attorney, Agent, or Firm* — Crowe & Dunlevy

(57) ABSTRACT

A photodiode produces photogenerated charges in response to exposure to light. An integration period collects the photogenerated charges. Collected photogenerated charges in excess of an overflow threshold are passed to an overflow sense node. Remaining collected photogenerated charges are passed to a sense node. A first signal representing the overflow photogenerated charges is read from the overflow sense node. A second signal representing the remaining photogenerated charges is read from the sense node.

29 Claims, 9 Drawing Sheets

IMAGE SENSOR WITH HIGH DYNAMIC RANGE

TECHNICAL FIELD

The present invention relates to image sensors and, in particular, to an image sensor having a high dynamic range.

BACKGROUND

Reference is made to FIG. 1 showing a circuit diagram for a conventional image sensor pixel 10. The pixel 10 includes a photodiode 12 having an anode coupled to a first supply voltage node (Vsub; i.e., substrate voltage, for example, ground) 14 and a cathode coupled to a charge collection node 16. The photodiode 12 may, for example, be of a pinned photodiode type. An n-channel metal oxide semiconductor field effect transistor (MOSFET) 18, referred to as an anti-blooming transistor, has a source terminal coupled to the charge collection node 16 and a drain terminal coupled to a second supply voltage node (Vrt; i.e., a pixel reference voltage) 20. A gate terminal of the anti-blooming transistor 18 is coupled to receive an anti-blooming transistor control signal (Cab). An n-channel MOSFET 22, referred to as a transfer gate transistor, has a source terminal coupled to the charge collection node 16 and a drain terminal coupled to a sense node 24. A gate terminal of the transfer gate transistor 22 is coupled to receive a transfer gate control signal (Ctg). The sense node 24 is also known in the art as the floating diffusion node and has an associated parasitic capacitance. An n-channel MOSFET 26, referred to as a reset transistor, has a drain terminal coupled to a third supply voltage node (Vrst; i.e., a pixel reset voltage) 28 and a source terminal coupled to the sense node 24. The voltages Vrt and Vrst may or may not be at the same voltage potential depending on application. A gate terminal of the reset transistor 26 is coupled to receive a reset control signal (Crst). An n-channel MOSFET 30 has a gate terminal coupled to the sense node 24. The transistor 30 functions as a source-follower transistor. The drain terminal of source-follower transistor 30 is coupled to the second supply voltage node (Vrt) 20 while the source terminal is coupled to an intermediate (read) node 32. The voltage at the intermediate node 32 follows the voltage at the sense node 24. An n-channel MOSFET 34, referred to as a read transistor, has a drain terminal coupled to the intermediate node 32 and a source node coupled to an output line (VX) 36. A gate terminal of the read transistor 34 is coupled to receive a read control signal (Crd). In an embodiment where the pixel circuit 10 is part of a pixel array, the output line (VX) may be shared by plural pixels in a column of the array.

Reference is now additionally made to FIG. 2. The operation of the pixel 10 is as follows: The pixel 10 is first placed in reset mode. The anti-blooming transistor control signal (Cab) is asserted to turn on the anti-blooming transistor 18 (reference 70) and reset the photodiode 12. The reset control signal (Crst) is also asserted to turn on the reset transistor 26 (reference 72) and reset the sense node 24. The pixel 10 then enters an integration phase. The reset control signal (Crst) is deasserted to raise the corresponding potential barrier (reference 74). Light 40 is received by the photodiode 12 and photogenerated charges are produced (reference 76) in a charge collection region at the charge collection node 16. In the event that the light 40 is strong, or the integration time period is too long, excess photogenerated charges can be produced causing the cathode potential at charge collection node 16 to fall below the anode potential of the photodiode 12. In such a case, the photodiode 12 becomes forward biased and the excess charge will spill over to neighboring pixels. This effect is referred to in the art as "blooming." To address this problem, the anti-blooming transistor control signal (Cab) is set at a voltage level that will slightly reduce the potential barrier presented by the anti-blooming transistor 18 (reference 78). In this configuration, the excess photogenerated charges instead pass (reference 80) to the drain terminal of the anti-blooming transistor 18. At the end of the integration phase, the pixel 10 enters the charge transfer phase. The anti-blooming transistor control signal (Cab) is deasserted to raise the corresponding potential barrier (reference 82). The transfer gate control signal (Ctg) is asserted to lower the corresponding potential barrier (reference 84) and the photogenerated charges are passed by the transfer gate transistor 22 to the sense node 24 (reference 86). The pixel 10 now enters the read out phase. The voltage potential on the sense node 24 is transferred to the intermediate (read) node 32 via the source-follower transistor 30. The read control signal (Crd) is asserted to turn on the read transistor 34 and transfer the voltage at the intermediate node 32 to the output line (VX) 36 (reference 88).

The operation of the pixel 10 in the manner described above can have an adverse effect on dynamic range. While the anti-blooming circuit and operation serves to address concerns with blooming, the photogenerated charges that are drained to the supply node 20 through the anti-blooming transistor 18 are lost and do not contribute at all to the signal that is read out to the output line (VX) 36.

SUMMARY

In an embodiment, an image sensor pixel circuit comprises: a photodiode configured to produce photogenerated charges in response to exposure to light for integration at a charge collection node; a transfer gate transistor circuit coupled to the charge collection node and configured to pass a first portion of the integrated photogenerated charges to a sense node; an overflow transistor coupled to the charge collection node and configured to pass a second portion of the integrated photogenerated charges to an overflow sense node; and read circuitry coupled to the sense node and overflow sense node and configured to read out a first signal representing the first portion from the sense node and read out a second signal representing the second portion from the overflow sense node.

In an embodiment, an image sensor pixel circuit comprises: a photodiode having a charge collection node; a transfer gate transistor coupled between the charge collection node and a sense node; an overflow transistor coupled between the charge collection node and an overflow sense node, said overflow transistor presenting a first barrier of potential for passing a first portion of charge from the charge collection node to the overflow sense node; and an anti-blooming transistor coupled between the charge collection node and a supply node, said anti-blooming transistor presenting a second barrier of potential for passing a second portion of charge from the charge collection node to the supply node; wherein the first barrier of potential is lower than the second barrier of potential.

In an embodiment, a method comprises: producing photogenerated charges in response to exposure of a photodiode to light; collecting the photogenerated charges by integration; passing a portion of the collected photogenerated charges in excess of a first barrier of potential to an overflow sense node; passing a remaining portion of the collected photogenerated charges to a sense node; reading from the overflow sense node a first signal representing the portion of the collected photogenerated charges in excess of the first barrier of potential; and reading from the sense node a second signal representing the remaining portion of the collected photogenerated charges.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 3:
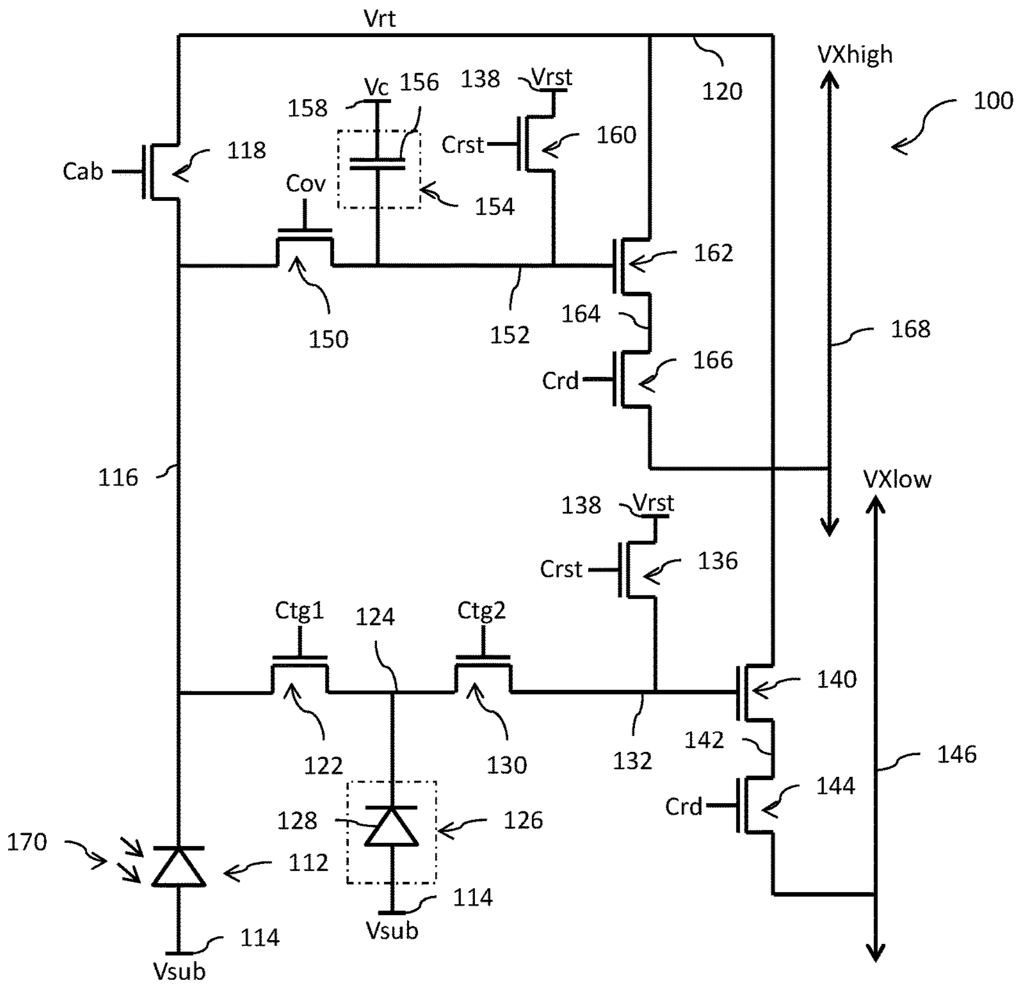
FIG. 3 is a circuit diagram for an image sensor pixel.

Reference is now made to FIG. 3 showing a circuit diagram for an image sensor pixel 100. The pixel 100 includes a photodiode 112 having an anode coupled to a first supply voltage node (Vsub; substrate voltage, for example, ground) 114 and a cathode coupled to a charge collection node 116. The photodiode 112 may, for example, be of a pinned photodiode type. An n-channel metal oxide semiconductor field effect transistor (MOSFET) 118, referred to as an anti-blooming transistor, has a source terminal coupled to the charge collection node 116 and a drain terminal coupled to a second supply voltage node (Vrt; pixel reference voltage) 120. A gate terminal of the anti-blooming transistor 118 is coupled to receive an anti-blooming transistor control signal (Cab). An n-channel MOSFET 122, referred to as a memory transfer gate transistor, has a source terminal coupled to the charge collection node 116 and a drain terminal coupled to a memory node 124. A gate terminal of the memory transfer gate transistor 122 is coupled to receive a first transfer gate control signal (Ctg1). The memory node 124 is a charge storage node with a charge storage device 126 coupled thereto in the form of a pinned capacitance (formed, for example, by a pinned memory diode) 128 having a first terminal (anode) coupled to the first supply voltage node (Vsub) 114 and a second terminal (cathode) coupled to the memory node 124. An n-channel MOSFET 130, referred to as a sense transfer gate transistor, has a source terminal coupled to the memory node 124 and a drain terminal coupled to a sense node 132. A gate terminal of the sense transfer gate transistor 130 is coupled to receive a second transfer gate control signal (Ctg2). The sense node 132 is also known in the art as the floating diffusion node (and has associated with it a parasitic capacitance). An n-channel MOSFET 136, referred to as a reset transistor, has a drain terminal coupled to a third supply voltage node (Vrst; pixel reset voltage) 138 and a source terminal coupled to the sense node 132. The voltages Vrt and Vrst may or may not have the same voltage potential depending on application. A gate terminal of the reset transistor 136 is coupled to receive a reset control signal (Crst). An n-channel MOSFET 140 has a gate terminal coupled to the sense node 132. The transistor 140 functions as a source-follower transistor. The drain terminal of source-follower transistor 140 is coupled to the second supply voltage node (Vrt) 120 while the source terminal is coupled to an intermediate (read) node 142. The voltage at the intermediate node 142 follows the voltage at the sense node 132. An n-channel MOSFET 144, referred to as a read transistor, has a drain terminal coupled to the intermediate node 142 and a source node coupled to a first (low intensity) output line (VXlow) 146. A gate terminal of the read transistor 144 is coupled to receive a read control signal (Crd). In an embodiment where the pixel circuit 100 is part of a pixel array, the output lines (VXhigh and VXlow) may be shared by plural pixels in a column of the array.

Figure 9:
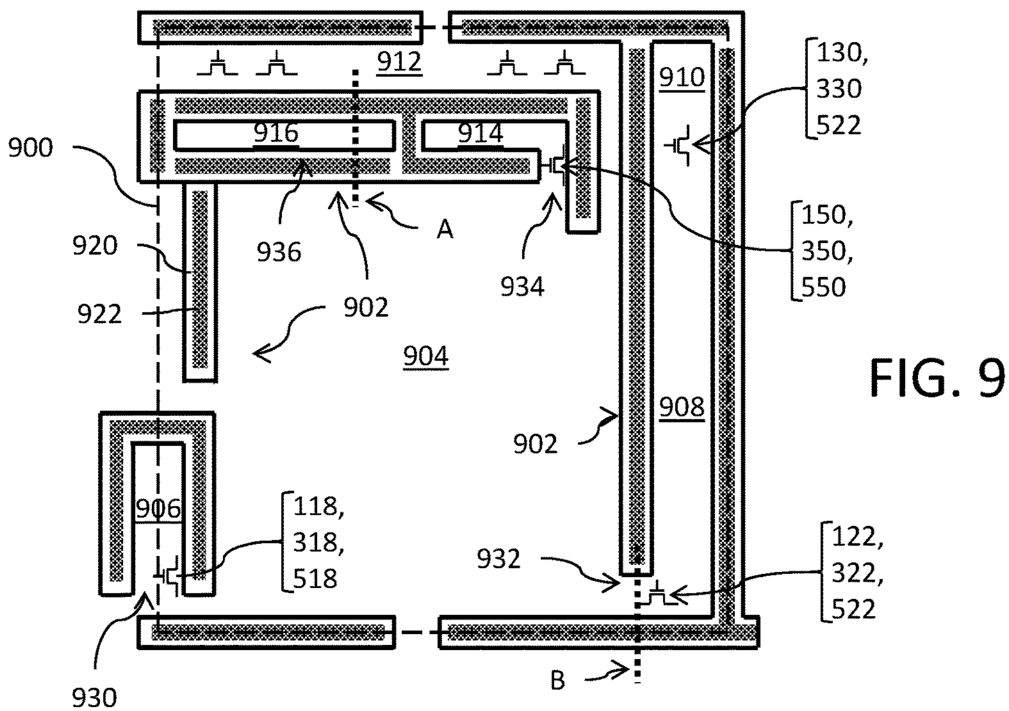
FIG. 9 shows a layout of the image sensor pixel.
Figure 10:
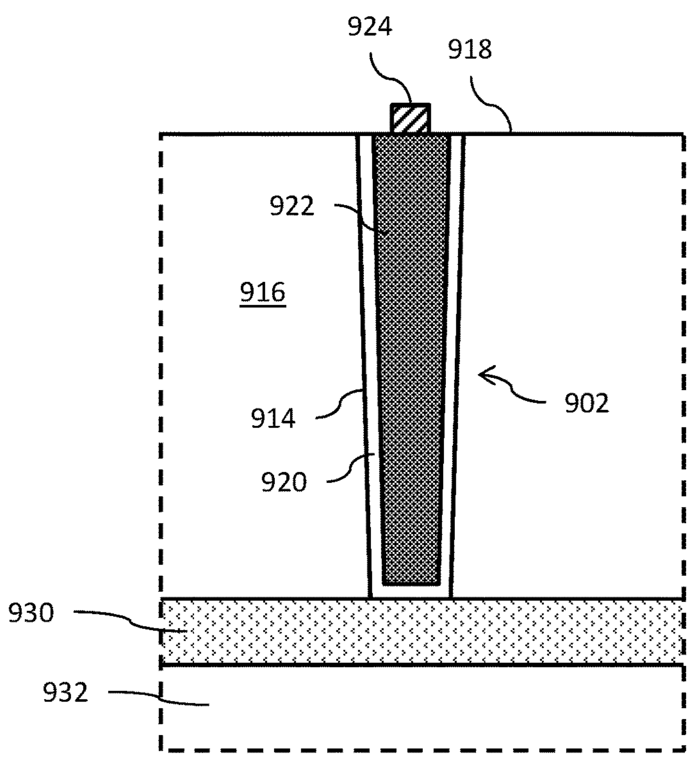
FIG. 10 is a cross sectional view of a capacitive deep trench isolation structure.

The pixel 100 further includes an n-channel MOSFET 150, referred to as an overflow transfer gate transistor, having a source terminal coupled to the charge collection node 116 and a drain terminal coupled to an overflow sense node 152. A gate terminal of the overflow transfer gate transistor 150 is coupled to receive an overflow transfer gate control signal (Cov). The overflow sense node 152 is a charge storage node with a charge storage device 154 coupled thereto in the form of a capacitor 156 having a first capacitor plate coupled to the overflow sense node 152 and a second capacitor plate coupled to a fourth supply voltage node (Vc; a pixel capacitance reference voltage) 158. The size of capacitor 156 is important because it defines how much charge can be stored through overflow. The potential at the fourth supply voltage node (Vc) 158 depends on how the storage capacitance is constructed. For a metal-oxide-metal capacitance, Vc can be any selected static voltage. In the embodiment shown, Vc is a static negative voltage of 0V to −2V because the storage capacitance, as shown in FIGS. 9-10, is based on an isolated silicon structure surrounded by a vertical gate in accumulation mode. The voltage Vc is effectively the gate voltage of this transistor and it needs to be negative to ensure proper operation. An n-channel MOSFET 160, referred to as a reset transistor, has a drain terminal coupled to the third supply voltage node (Vrst) 138 and a source terminal coupled to the overflow sense node 152. A gate terminal of the reset transistor 160 is coupled to receive the reset control signal (Crst). An n-channel MOSFET 162 has a gate terminal coupled to the overflow sense node 152. The transistor 162 functions as a source-follower transistor. The drain terminal of source-follower transistor 162 is coupled to the second supply voltage node (Vrt) 120 while the source terminal is coupled to an intermediate (read) node 164. The voltage at the charge collection node 164 follows the voltage at the overflow sense node 152. An n-channel MOSFET 166, referred to as a read transistor, has a drain terminal coupled to the charge collection node 164 and a source node coupled to a second (high intensity) output line (VXhigh) 168. A gate terminal of the read transistor 166 is coupled to receive a read control signal (Crd).

Figure 1:
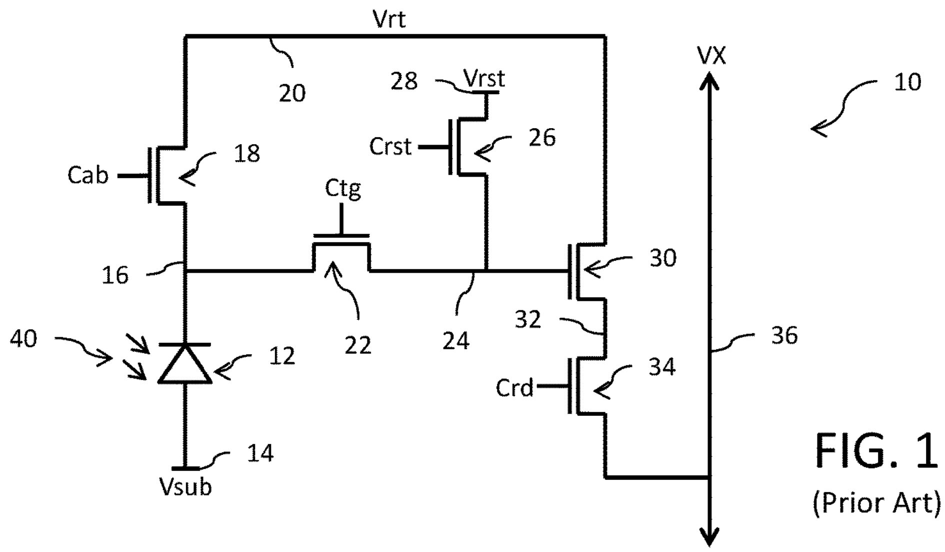
FIG. 1 is a circuit diagram for a conventional image sensor pixel.
Figure 2:
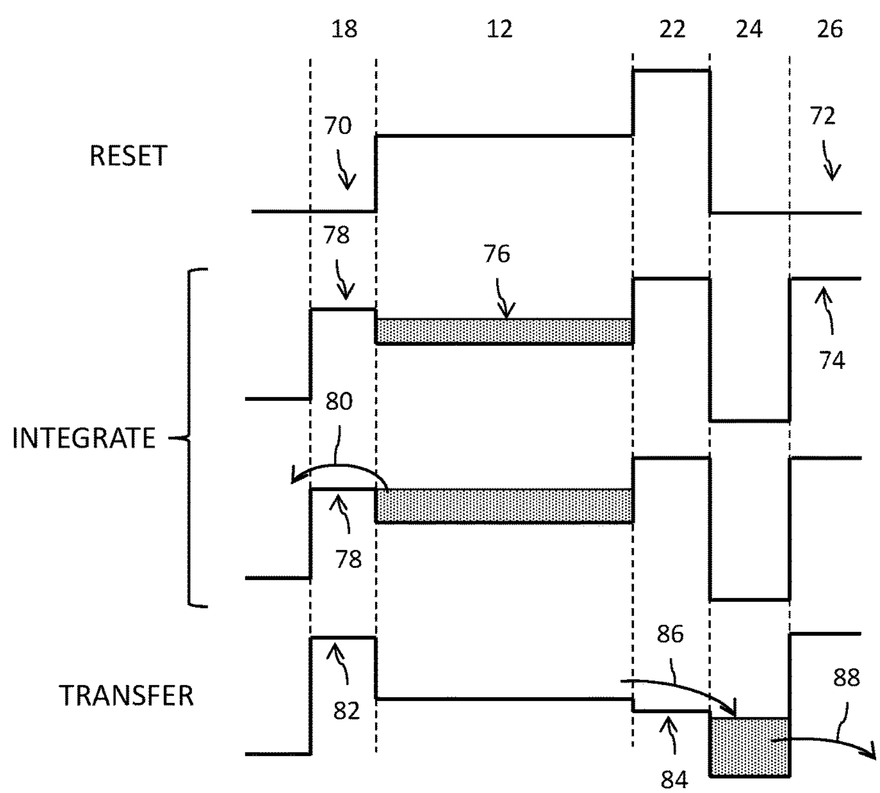
FIG. 2 illustrates potential wells in the context of operation of the sensor pixel of FIG. 1.
Figure 4A:
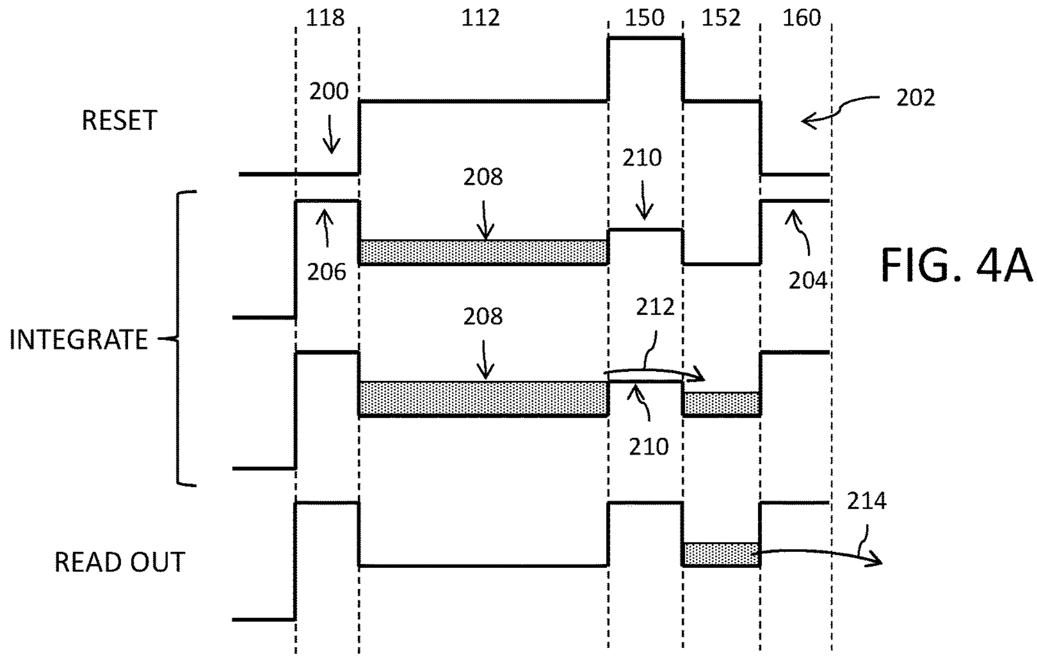
FIGS. 4A-4B illustrate potential wells in the context of operation of the sensor pixel of FIG. 3.
Figure 4B:
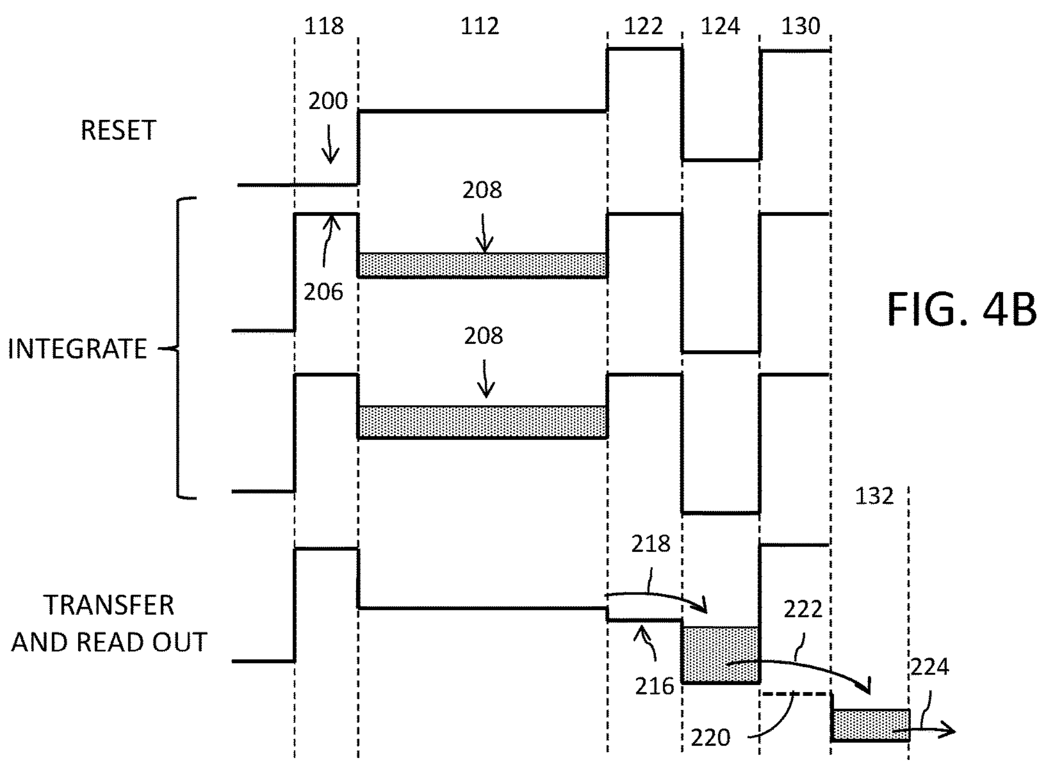

Reference is now additionally made to FIGS. 4A-4B. The operation of the pixel 100 is as follows: The pixel 100 is first placed in reset mode. The anti-blooming transistor control signal (Cab) is asserted to turn on the anti-blooming transistor 118 (reference 200) and reset the photodiode 112. The reset control signal (Crst) is also asserted to turn on the reset transistors 136 and 160 so as to reset the sense node 132 and overflow sense node 152 (reference 202, and as generally show at reference 72 in FIG. 2). The pixel 100 then enters an integration phase. The reset control signal (Crst) is deasserted to raise the corresponding potential barriers (reference 204, and as generally shown at reference 74 in FIG. 2). The anti-blooming transistor control signal (Cab) is further deasserted (reference 206), although it will be understood that the anti-blooming transistor control signal (Cab) could alternatively be controlled as shown in FIG. 2 (reference 78). Light 170 is received by the photodiode 112 and photogenerated charges are produced (reference 208). In the event that the light 170 is strong, or the integration time period is too long, excess photogenerated charges can be produced at the charge collection region provided at the charge collection node 116. The excess photogenerated charges may be lost, for example, due to the blooming problem as known in the art and discussed herein in connection with FIGS. 1 and 2. To address this problem, the overflow transfer gate control signal (Cov) is set at a voltage level that will slightly reduce the potential barrier presented by the overflow transfer gate transistor 150 (reference 210). In this configuration, the excess photogenerated charges will pass (reference 212) to the overflow sense node 152 through transistor 150 and be stored by the capacitor 156 of the charge storage device 154.

At the end of the integration phase, the pixel 100 enters the charge transfer phase. The first transfer gate control signal (Ctg1) is asserted to lower the corresponding potential barrier (reference 216) and the photogenerated charges are passed by the transfer gate transistor 122 (reference 218) to the memory node 124 and are stored by the diode 128 of the charge storage device 126. The assertion of first transfer gate control signal (Ctg1) is preferably a pulse signal. Although not shown in FIG. 4B, it will be understood that after the pulsing of first transfer gate control signal (Ctg1) the anti-blooming transistor control signal (Cab) is asserted to turn on the anti-blooming transistor 118 so as to drain further charge generated by the diode 112 at node 116 and thus prevent reactivation of overflow through transistor 150.

The pixel 100 now enters the read out phase. In order to cancel systematic noise (mismatch) due to the source follower transistors 140 and 162 and cancel temporal noise due to kTC, a correlated double sampling operation as known in the art is performed during read out.

The reset control signal (Crst) is pulsed to turn on transistor 136 and bring node 132 to the reset voltage Vrst. The voltage potential on the sense node 132 is transferred to the charge collection node 142 via the source-follower transistor 140. The read control signal (Crd) is then asserted to turn on the read transistor 144. The voltage at the intermediate node 142 is transferred by read transistor 144 to the first (low intensity) output line (VXlow) 146 to form a first reference voltage. Next, assertion of the second transfer gate control signal (Ctg2) lowers the corresponding potential barrier (reference 220) and the charge stored on the memory node 124 is transferred by the transfer gate transistor 130 to the sense node 132 (reference 222). The voltage potential on the sense node 132 is transferred to the charge collection node 142 via the source-follower transistor 140. The read control signal (Crd) is then asserted to turn on the read transistor 144. The voltage at the intermediate node 142 is transferred (reference 224) by read transistor 144 to the first (low intensity) output line (VXlow) 146 to form a signal voltage. The difference between the signal voltage and the first reference voltage represents the actual signal without source-follower mismatch and kTC noise.

The voltage potential on the sense node 152 is transferred to the charge collection node 164 via the source-follower transistor 162 (reference 214). The read control signal (Crd) is then asserted to turn on the read transistor 166. The voltage at the intermediate node 164 is transferred (reference 214) by read transistor 166 to the second (high intensity) output line (VXhigh) 168 to form an overflow signal voltage. The reset control signal (Crst) is pulsed to bring node 152 to the reset voltage Vrst. The voltage potential on the sense node 152 is transferred to the charge collection node 164 via the source-follower transistor 162. The read control signal (Crd) is then asserted to turn on the read transistor 166. The voltage at the intermediate node 164 is transferred by read transistor 166 to the second (high intensity) output line (VXhigh) 168 to form a second reference voltage. The difference between the overflow signal voltage and the second reference voltage represents the actual overflow signal without source-follower mismatch. The kTC noise cannot be canceled with this implementation.

Thus, in this configuration, each pixel 100 has two outputs, one output having an overflow signal comprising a read of the voltage potential due to the excess photogenerated charges captured at the overflow sense node 152, and a second output having a signal comprising a read of the voltage potential due to the photogenerated charges captured at the memory node 124. The actual signal and actual overflow signal can then be processed to produce a pixel output signal with improved dynamic range.

An advantage of the disclosed operation is that only a single exposure and integration is used to capture the photogenerated charges in high intensity light scenarios. This is different from, and more efficient than, prior art implementations which support high dynamic range by taking successive exposures with different integration times in order to modulate pixel sensitivity. Another advantage of the disclosed operation is that it is compatible with global shutter operation. All lines of a pixel array can share the same input signal for Ctg1 and Cab controls. This means that integration start and stop is synchronous for all pixels of the array.

Figure 5:
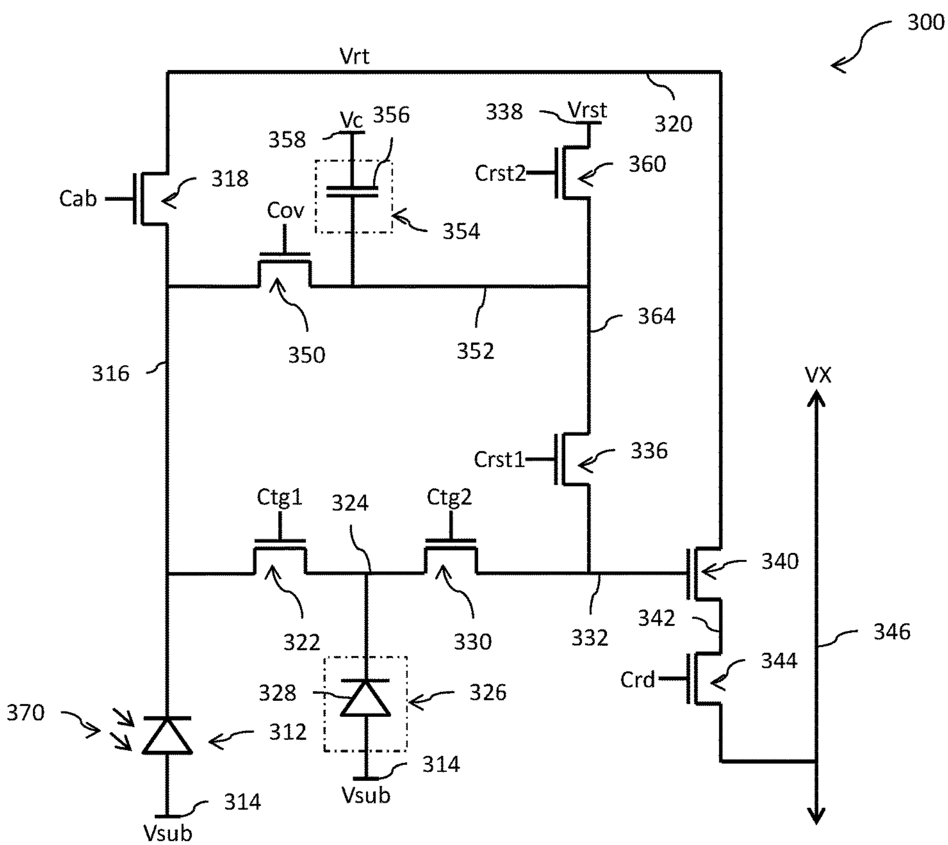
FIG. 5 is a circuit diagram for an image sensor pixel.

Reference is now made to FIG. 5 showing a circuit diagram for an image sensor pixel 300. The pixel 300 includes a photodiode 312 having an anode coupled to a first supply voltage node (Vsub; substrate voltage) 314 and a cathode coupled to a charge collection node 316. The photodiode 312 may, for example, be of a pinned photodiode type. An n-channel metal oxide semiconductor field effect transistor (MOSFET) 318, referred to as an anti-blooming transistor, has a source terminal coupled to the charge collection node 316 and a drain terminal coupled to a second supply voltage node (Vrt; pixel reference voltage) 320. A gate terminal of the anti-blooming transistor 318 is coupled to receive an anti-blooming transistor control signal (Cab). An n-channel MOSFET 322, referred to as a memory transfer gate transistor, has a source terminal coupled to the charge collection node 316 and a drain terminal coupled to a memory node 324. A gate terminal of the memory transfer gate transistor 322 is coupled to receive a first transfer gate control signal (Ctg1). The memory node 324 is a charge storage node with a charge storage device 326 coupled thereto in the form of a diode 328 having an anode coupled to the first supply voltage node (Vsub) 314 and a cathode coupled to the memory node 324. An n-channel MOSFET 330, referred to as a sense transfer gate transistor, has a source terminal coupled to the memory node 324 and a drain terminal coupled to a sense node 332. A gate terminal of the sense transfer gate transistor 330 is coupled to receive a second transfer gate control signal (Ctg2). The sense node 332 is also known in the art as the floating diffusion node. An n-channel MOSFET 336, referred to as a reset transistor, has a drain terminal coupled to an intermediate node 364 and a source terminal coupled to the sense node 332. A gate terminal of the reset transistor 336 is coupled to receive a first reset control signal (Crst1). An n-channel MOSFET 340 has a gate terminal coupled to the sense node 332. The transistor 340 functions as a source-follower transistor. The drain terminal of source-follower transistor 340 is coupled to the second supply voltage node (Vrt) 320 while the source terminal is coupled to an intermediate (read) node 342. The voltage at the intermediate node 342 follows the voltage at the sense node 332. An n-channel MOSFET 344, referred to as a read transistor, has a drain terminal coupled to the intermediate (read) node 342 and a source node coupled to an output line (VX) 346. A gate terminal of the read transistor 344 is coupled to receive a read control signal (Crd). In an embodiment where the pixel circuit 10 is part of a pixel array, the output line (VX) may be shared by plural pixels in a column of the array.

The pixel 300 further includes an n-channel MOSFET 350, referred to as an overflow transfer gate transistor, has a source terminal coupled to the charge collection node 316 and a drain terminal coupled to an overflow sense node 352 (also referred to herein as the intermediate node 364). A gate terminal of the overflow transfer gate transistor 350 is coupled to receive an overflow transfer gate control signal (Cov). The overflow sense node 352 is a charge storage node with a charge storage device 354 coupled thereto in the form of a capacitor 356 having a first capacitor plate coupled to the overflow sense node 352 and a second capacitor plate coupled to a fourth supply voltage node (Vc; capacitor reference voltage) 358. An n-channel MOSFET 360, referred to as a reset transistor, has a drain terminal coupled to a third supply voltage node (Vrst) 338 and a source terminal coupled to the intermediate node 364 and overflow sense node 352. A gate terminal of the reset transistor 360 is coupled to receive a second reset control signal (Crst2).

Figure 6A:
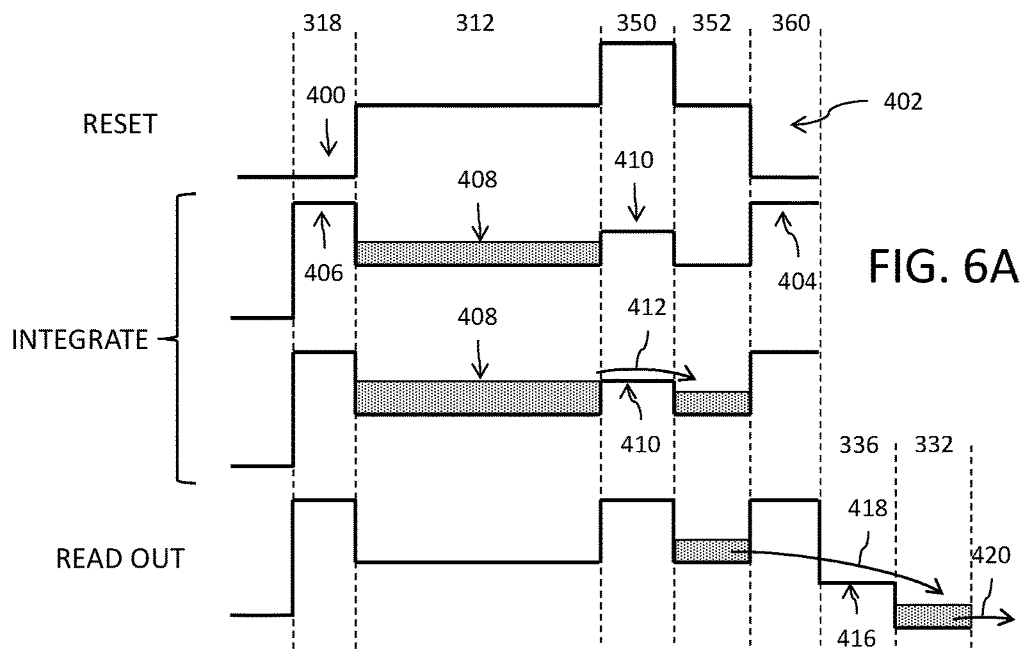
FIGS. 6A-6B illustrate potential wells in the context of operation of the sensor pixel of FIG. 5.
Figure 6B:
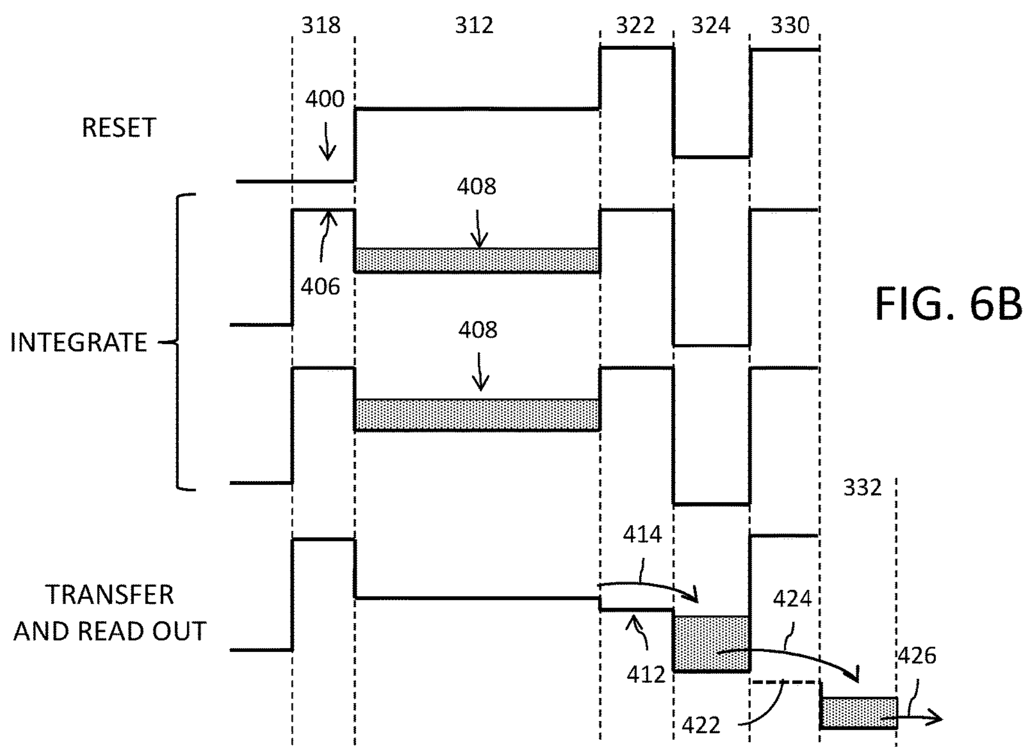

Reference is now additionally made to FIGS. 6A-6B. The operation of the pixel 300 is as follows: The pixel 300 is first placed in reset mode. The anti-blooming transistor control signal (Cab) is asserted to turn on the anti-blooming transistor 318 (reference 400) and reset the photodiode 312. The first and second reset control signals (Crst1 and Crst2) are also asserted to turn on the reset transistors 336 and 360 so as to reset both the sense node 332 and overflow sense node 352 (reference 402, and as generally show at reference 72 in FIG. 2). The pixel 300 then enters an integration phase. The first and second reset control signals (Crst1 and Crst2) are deasserted to raise the corresponding potential barriers (reference 404, and as generally shown at reference 74 in FIG. 2). The anti-blooming transistor control signal (Cab) is further deasserted (reference 406), although it will be understood that the anti-blooming transistor control signal (Cab) could alternatively be controlled as shown in FIG. 2 (reference 78). Light 370 is received by the photodiode 312 and photogenerated charges are produced (reference 408). In the event that the light 370 is strong, or the integration time period is too long, excess photogenerated charges can be produced. The excess photogenerated charges may be lost, for example, due to the blooming problem as known in the art and discussed herein in connection with FIGS. 1 and 2. To address this problem, the overflow transfer gate control signal (Cov) is set at a voltage level that will reduce the potential barrier presented by the overflow transfer gate transistor 350 (reference 410). In this configuration, the excess photogenerated charges will pass (reference 412) to the overflow sense node 352 and be stored by the capacitor 356 of the charge storage device 354.

At the end of the integration phase, the pixel 300 enters the charge transfer phase. The first transfer gate control signal (Ctg1) is asserted to lower the corresponding potential barrier (reference 412) and the photogenerated charges are passed by the transfer gate transistor 322 (reference 414) to the memory node 324 and are stored by the diode 328 of the charge storage device 326. The assertion of first transfer gate control signal (Ctg1) is preferably a pulse signal. Although not shown in FIG. 6B, it will be understood that after the pulsing of first transfer gate control signal (Ctg1) the anti-blooming transistor control signal (Cab) is asserted to turn on the anti-blooming transistor 318 so as to drain charge generated at node 316 and thus prevent reactivation of overflow through transistor 350.

The pixel 300 now enters the read out phase. In order to cancel systematic noise (mismatch) due to the source follower transistor 340 and cancel temporal noise due to kTC, a correlated double sampling operation as known in the art is performed.

The first reset control signal (Crst1) is asserted to lower the corresponding potential barrier (reference 416) and the voltage potential on the overflow sense node 352 is then transferred by the reset transistor 336 to the sense node 332 (reference 418). The voltage potential on the sense node 332 is then transferred to the intermediate node 342 via the source-follower transistor 340 (reference 420). The read control signal (Crd) is asserted to turn on the read transistor 344 and the voltage at the intermediate node 342 is transferred by read transistor 344 to the output line (VX) 346 to form an overflow signal voltage. The second reset control signal (Crst2) is then pulsed to bring node 352 to the reset voltage Vrst. The voltage potential on the overflow sense node 352 is then transferred by the reset transistor 336 to the sense node 332. The voltage potential on the sense node 332 is then transferred to the intermediate node 342 via the source-follower transistor 340. The read control signal (Crd) is asserted to turn on the read transistor 344 and the voltage at the intermediate node 342 is transferred by read transistor 344 to the output line (VX) 346 to form a reference voltage. The difference between the overflow signal voltage and the reference voltage represents the actual overflow signal without source-follower mismatch.

The first reset control signal (Crst1) is then deasserted to raise the corresponding potential barrier. Next, the second transfer gate control signal (Ctg2) is asserted to lower the corresponding potential barrier (reference 422) and the charge stored on the memory node 324 is transferred by the transfer gate transistor 330 to the sense node 332 (reference 424). The voltage potential on the sense node 332 is then transferred to the intermediate node 342 via the source-follower transistor 340 (reference 426). The read control signal (Crd) is then asserted to turn on the read transistor 344 and the voltage at the intermediate node 342 is transferred by read transistor 344 to the output line (VX) 346 to form a signal voltage. The difference between the signal voltage and the reference voltage represents the actual signal without source-follower mismatch and kTC noise.

Thus, two consecutive reads are performed in this implementation, with the first read comprising a read of the voltage potential due to the excess photogenerated charges captured at the overflow sense node 352, and with the second read comprising a read of the voltage potential due to the photogenerated charges captured at the memory node 324.

An advantage of the disclosed operation is that only a single exposure and integration is used to capture the photogenerated charges in high intensity light scenarios. This is different from, and more efficient than, prior art implementations which support high dynamic range by taking successive exposures with different integration times in order to modulate pixel sensitivity. Another advantage of the disclosed operation is that it is compatible with global shutter operation. All lines of a pixel array can share the same input signal for Ctg1 and Cab controls. This means that integration start and stop is synchronous for all pixels of the array.

Figure 7:
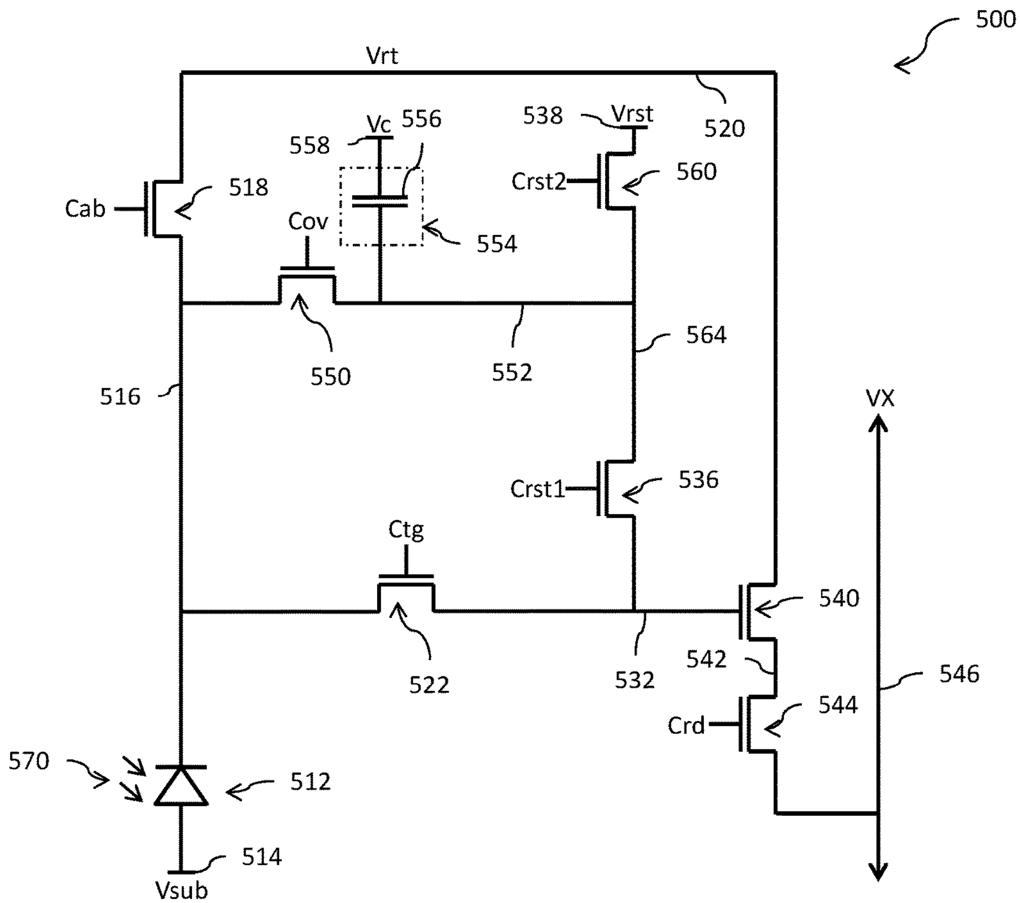
FIG. 7 is a circuit diagram for an image sensor pixel.

Reference is now made to FIG. 7 showing a circuit diagram for an image sensor pixel 500. The pixel 500 includes a photodiode 512 having an anode coupled to a first supply voltage node (Vsub; substrate voltage) 514 and a cathode coupled to an charge collection node 516. The photodiode 512 may, for example, be of a pinned photodiode type. An n-channel metal oxide semiconductor field effect transistor (MOSFET) 518, referred to as an anti-blooming transistor, has a source terminal coupled to the charge collection node 516 and a drain terminal coupled to a second supply voltage node (Vrt; pixel reference voltage) 520. A gate terminal of the anti-blooming transistor 518 is coupled to receive an anti-blooming transistor control signal (Cab). An n-channel MOSFET 522, referred to as a transfer gate transistor, has a source terminal coupled to the charge collection node 516 and a drain terminal coupled to a sense node 532. A gate terminal of the transfer gate transistor 522 is coupled to receive a transfer gate control signal (Ctg). The sense node 532 is also known in the art as the floating diffusion node. An n-channel MOSFET 536, referred to as a reset transistor, has a drain terminal coupled to an intermediate node 564 and a source terminal coupled to the sense node 532. A gate terminal of the reset transistor 536 is coupled to receive a first reset control signal (Crst1). An n-channel MOSFET 540 has a gate terminal coupled to the sense node 532. The transistor 540 functions as a source-follower transistor. The drain terminal of source-follower transistor 540 is coupled to the second supply voltage node (Vrt) 520 while the source terminal is coupled to an intermediate node 542. The voltage at the intermediate node 542 follows the voltage at the sense node 532. An n-channel MOSFET 544, referred to as a read transistor, has a drain terminal coupled to the intermediate node 542 and a source node coupled to an output line (VX) 546. A gate terminal of the read transistor 544 is coupled to receive a read control signal (Crd). In an embodiment where the pixel circuit 10 is part of a pixel array, the output line (VX) may be shared by plural pixels in a column of the array.

The pixel 500 further includes an n-channel MOSFET 550, referred to as an overflow transfer gate transistor, has a source terminal coupled to the charge collection node 516 and a drain terminal coupled to an overflow sense node 552 (also referred to herein as the intermediate node 564). A gate terminal of the overflow transfer gate transistor 550 is coupled to receive an overflow transfer gate control signal (Cov). The overflow sense node 552 is a charge storage node with a charge storage device 554 coupled thereto in the form of a capacitor 556 having a first capacitor plate coupled to the overflow sense node 552 and a second capacitor plate coupled to a fourth supply voltage node (Vc; capacitor reference voltage) 558. An n-channel MOSFET 560, referred to as a reset transistor, has a drain terminal coupled to a third supply voltage node (Vrst) 538 and a source terminal coupled to the intermediate node 564 and overflow sense node 552. A gate terminal of the reset transistor 560 is coupled to receive a second reset control signal (Crst2).

Figure 8A:
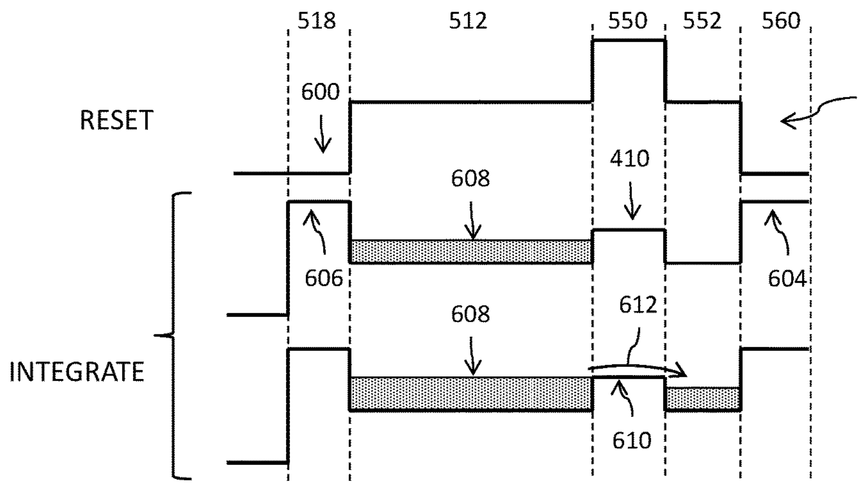
FIGS. 8A-8B illustrate potential wells in the context of operation of the sensor pixel of FIG. 7.
Figure 8B:
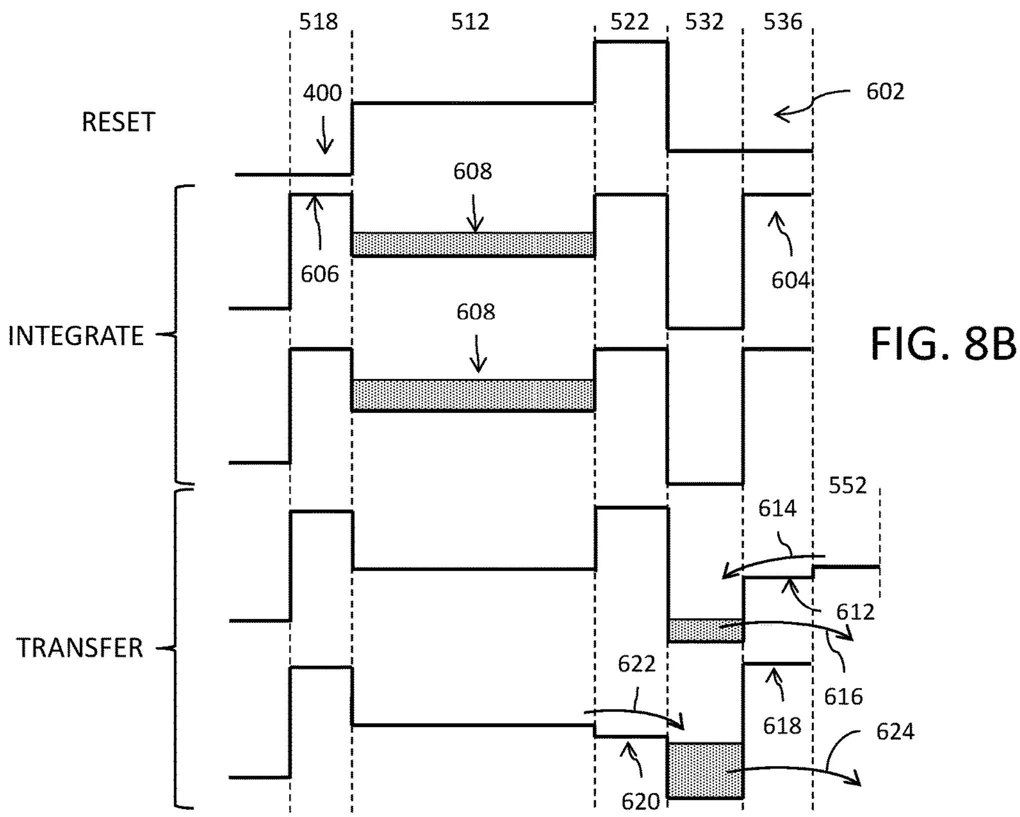

Reference is now additionally made to FIGS. 8A-8B. The operation of the pixel 500 is as follows: The pixel 500 is first placed in reset mode. The anti-blooming transistor control signal (Cab) is asserted to turn on the anti-blooming transistor 518 (reference 600) and reset the photodiode 512. The first and second reset control signals (Crst1 and Crst2) are also asserted to turn on the reset transistors 536 and 560 so as to reset both the sense node 532 and overflow sense node 552 (reference 602, and as generally show at reference 72 in FIG. 2). The pixel 500 then enters an integration phase. The first and second reset control signals (Crst1 and Crst2) are deasserted to raise the corresponding potential barriers (reference 604, and as generally shown at reference 74 in FIG. 2). The anti-blooming transistor control signal (Cab) is further deasserted (reference 606), although it will be understood that the anti-blooming transistor control signal (Cab) could alternatively be controlled as shown in FIG. 2 (reference 78). Light 570 is received by the photodiode 512 and photogenerated charges are produced (reference 608). In the event that the light 570 is strong, or the integration time period is too long, excess photogenerated charges can be produced. The excess photogenerated charges may be lost, for example, due to the blooming problem as known in the art and discussed herein in connection with FIGS. 1 and 2. To address this problem, the overflow transfer gate control signal (Cov) is set at a voltage level that will reduce the potential barrier presented by the overflow transfer gate transistor 350 (reference 610). In this configuration, the excess photogenerated charges will pass (reference 612) to the overflow sense node 552 and are stored by the capacitor 556 of the charge storage device 554.

The first reset control signal (Crst1) is asserted to lower the corresponding potential barrier (reference 612) and the voltage potential on the overflow sense node 552 is then transferred by the reset transistor 536 to the sense node 532 (reference 614). The voltage potential on the sense node 532 is then transferred (reference 616) to the intermediate node 542 via the source-follower transistor 540. The read control signal (Crd) is then asserted to turn on the read transistor 544 and the voltage at the intermediate node 542 is transferred by read transistor 544 to the output line (VX) 546 as the overflow signal voltage. Then, the second reset control signal (Crst2) is asserted to set both nodes 532 and 552 to the reset voltage Vrst. The second reset control signal (Crst2) is deasserted. The read control signal (Crd) is then asserted to turn on the read transistor 544 and the voltage at the intermediate node 542 is transferred by read transistor 544 to the output line (VX) 546 as a reference voltage. The difference between the overflow signal voltage and the reference voltage represents the actual overflow signal without source-follower mismatch.

The first reset control signal (Crst1) is then deasserted to raise the corresponding potential barrier (reference 618). Next, the transfer gate control signal (Ctg) is asserted to lower the corresponding potential barrier (reference 620) and the charge from the photodiode 512 is transferred by the transfer gate transistor 522 to the sense node 532 (reference 622). The voltage potential on the sense node 532 is then transferred to the intermediate node 542 via the source-follower transistor 540 (reference 624). The read control signal (Crd) is then asserted to turn on the read transistor 544 and the voltage at the intermediate node 542 is transferred by read transistor 544 to the output line (VX) 546 to form the signal voltage. The difference between the signal voltage and the reference voltage represents the actual signal without source-follower mismatch and kTC noise.

Thus, two consecutive reads are performed in this implementation, with the first read comprising a read of the voltage potential due to the excess photogenerated charges captured at the overflow sense node 552, and with the second read comprising a read of the voltage potential due to the photogenerated charges at the photodiode 512.

An advantage of the disclosed operation is that only a single exposure and integration is used to capture the photogenerated charges in high intensity light scenarios. This is different from, and more efficient than, prior art implementations which support high dynamic range by taking successive exposures with different integration times in order to modulate pixel sensitivity. This embodiment supports only a rolling-shutter type of operation where each line of the array is completely read before integration on a next line of the array is stopped. A drawback of rolling-shutter operation is the possible introduction of image artifacts when the imaged scene is composed of moving objects.

Reference is now made to FIG. 9 showing a plan layout of the pixel 100, 300, 500 (collectively referred to as pixel 900) of an image sensor array that includes many such pixels arranged in an array format defined by a plurality of rows and columns. The pixel 900 includes a plurality of capacitive deep trench isolation (CDTI) structures 902 which generally delimit circuit regions of the pixel. For example, the CDTI structures 900 delimit a photosensitive region 904, an anti-blooming region 906, a memory region 908, a sensing node region 910, a signal treatment region 912, an overflow region 914 and an overflow storage region 916. The pixel layout may be tiled in a manner well known to those skilled in the art to form the sensor array. In such an array, certain structures such as, for example, the anti-blooming region 906 and a portion of the signal treatment region 912, may be shared circuitry between two or more adjacent pixels in the array.

FIG. 10 shows a cross section of a capacitive deep trench isolation (CDTI) structure 902. A trench 914 is formed extending into a semiconductor substrate 916 from a top surface 918. The trench 914 is lined with an insulating material 920 such as an oxide material and filled with a conductive material 922 such as a metal or polysilicon. A contact 924 may be provided at the top surface to support the application of a voltage to the conductive material 922. In this implementation, the semiconductor substrate 916 is of the silicon on insulator (SOI) type which includes a buried oxide (BOX) layer 930 and a support substrate 932. In an alternative implementation, a bulk substrate may instead be used.

With the use of capacitive deep trench isolation (CDTI) structures 902, certain ones of the MOSFETs of the pixel circuit may be advantageously implemented using vertical MOS transistor technology. For example, anti-blooming transistors 118, 318, 518 may utilize the capacitive deep trench isolation (CDTI) structures 902 generally indicated at reference 930 to form the transistor gate to which the anti-blooming transistor control signal (Cab) is applied. Also, memory transfer gate transistors 122, 322 may utilize the capacitive deep trench isolation (CDTI) structures 902 generally indicated at reference 932 to form the transistor gate to which the first transfer gate control signal (Ctg1) is applied. Still further, overflow transfer gate transistors 150, 350, 550 may utilize the capacitive deep trench isolation (CDTI) structures 902 generally indicated at reference 934 to form the transistor gate to which the overflow transfer gate control signal (Cov) is applied. The transistors implemented using this vertical MOS transistor technology are of the "normally on" type configuration, and are turned "off" by applying an appropriate voltage to the conductive material 922 of the capacitive deep trench isolation (CDTI) structures 902 on each side of the opening. The application of the appropriate voltage for the gate control signal results in the formation of a fully depleted channel. The threshold voltages of such transistors depend on the gate space (channel width), and this can be accurately controlled during the design stage.

The barrier of potential for the anti-blooming transistors 118, 318, 518 may be accurately controlled in this implementation through the design of the layout, in particular the amount of space provided between the capacitive deep trench isolation (CDTI) structures 902 at reference 930, and with the setting of the voltage for the anti-blooming transistor control signal (Cab). The barrier of potential for the overflow transfer gate transistors 150, 350, 550 may be accurately controlled in this implementation through the design of the layout, in particular the amount of space provided between the capacitive deep trench isolation (CDTI) structures 902 at reference 934, and with the setting of the voltage for the overflow transfer gate control signal (Cov). In this regard, it is important to accurately control the relative barriers of potential to ensure that the barrier of the overflow transfer gate transistors 150, 350, 550 is lower than the barrier of the anti-blooming transistors 118, 318, 518.

Figure 11:
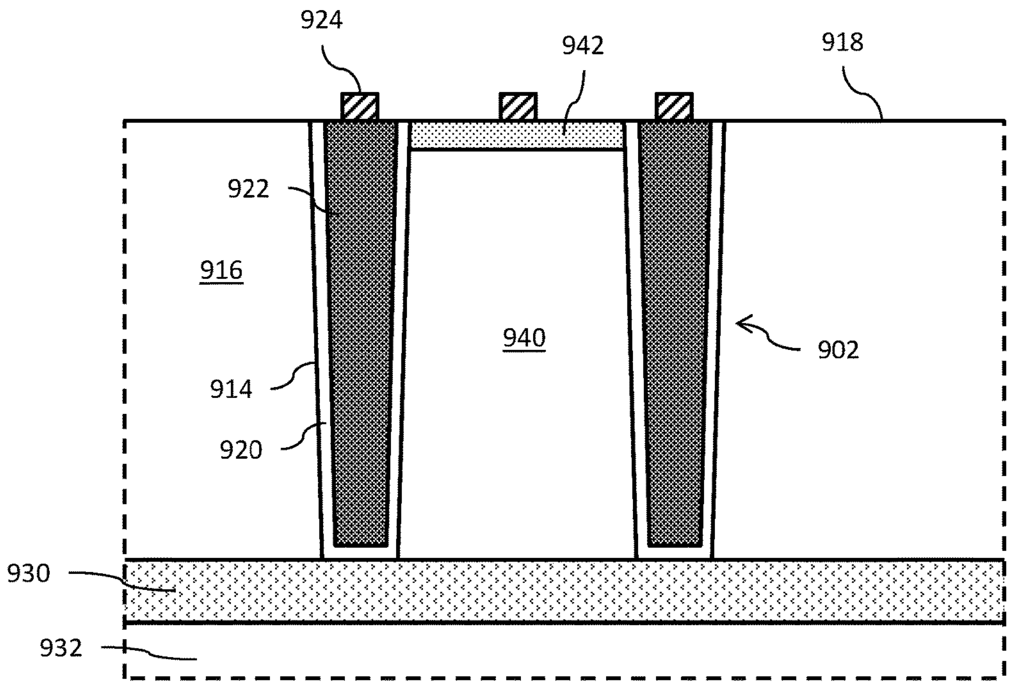
FIG. 11 is a cross sectional view of a capacitor structure.

The charge storage device 154 is implemented in the overflow storage region 916 in the form of a capacitor of the vertical MOS transistor type where a first capacitor plate is provided by a doped region (electrically coupled to overflow region 914) and a second capacitor plate provided by the conductive material 922 portion of the adjacent capacitive deep trench isolation (CDTI) structure 902 as generally shown at reference 936. FIG. 11 shows a cross sectional view of the overflow storage region 916 (taken at line A in FIG. 9). The capacitive deep trench isolation (CDTI) structures 902 fully surround a doped region 940 of the substrate that provides the first capacitor plate. A heavily doped region 942 is provided for interconnecting to the contact 924. The conductive material 922 portion of the capacitive deep trench isolation (CDTI) structures 902 provides the second capacitor plate with an interconnecting contact 924. In the event that a bulk substrate is used, the charge storage device 154 cannot be implemented as shown in FIG. 11, but rather could instead be implemented using a conventional planar MOS capacitor formed within the overflow storage region 916.

Figure 12:
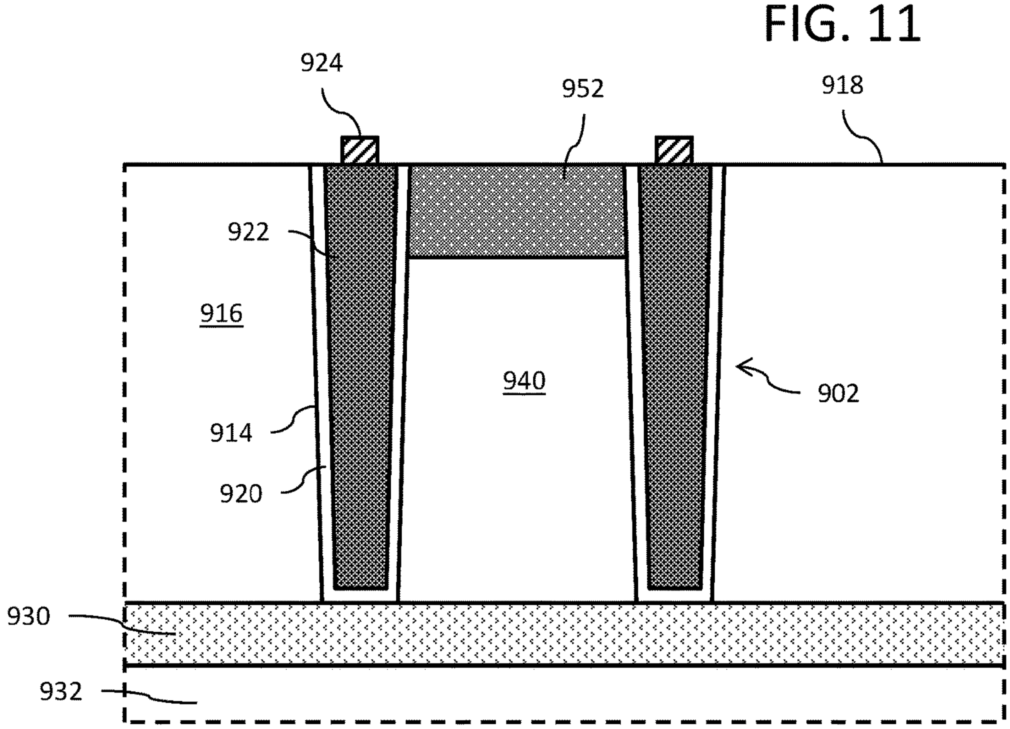
FIG. 12 is a cross sectional view of a transistor structure.

Reference is now made to FIG. 12 showing a cross sectional view (taken at line B of FIG. 9) of the vertical MOS transistor technology used for certain ones of the MOSFETs of the pixel circuit as noted above. The two capacitive deep trench isolation (CDTI) structures 902 are provided on opposite sides of a doped channel region 952. In this implementation, the doped channel region 952 is an extension of the doped region of the pinned photodiode. This structure is in a "normally on" condition that permits the conduction of charge from the photodiode through the transistor channel region. However, if the conductive material 922 portion of the capacitive deep trench isolation (CDTI) structures 902 is polarized with a certain voltage potential (in this case, a negative potential), the implanted channel provided by the doped channel region 952 is depleted of carriers. The degree of depletion of carriers determined the barrier of potential. As noted herein, the barrier of potential for the anti-blooming transistor and the overflow transfer gate transistor are created in the same way, but are tuned differently. Specifically, the barrier of potential for the overflow transfer gate transistor is lower than the barrier of potential for the anti-blooming transistor.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An image sensor pixel circuit, comprising:

a photodiode configured to produce photogenerated charges in response to exposure to light for integration at a charge collection node;

a transfer gate transistor circuit coupled to the charge collection node and configured to pass a first portion of the integrated photogenerated charges to a sense node;

an overflow transistor coupled to the charge collection node and configured to pass a second portion of the integrated photogenerated charges to an overflow sense node; and read circuitry coupled to the sense node and overflow sense node and configured to read out a first signal representing the first portion from the sense node and read out a second signal representing the second portion from the overflow sense node.

2. The image sensor pixel circuit of claim 1, further comprising an anti-blooming transistor configured to pass a third portion of the integrated photogenerated charges to a supply node.

3. The image sensor pixel circuit of claim 2, wherein a barrier of potential of the overflow transistor to pass the second portion of the integrated photogenerated charges to the overflow sense node is less than a barrier of potential of the anti-blooming transistor to pass third portion of the integrated photogenerated charges to the supply node.

4. The image sensor pixel circuit of claim 3, wherein said overflow transistor and said anti-blooming transistor each comprise a transistor structure including:

a doped channel region; and a pair of capacitive deep trench isolation structures on opposite sides of the doped channel region, each capacitive deep trench isolation structure including a conductive region configured to be biased by a control voltage which depletes the doped channel region of carriers.

5. The image sensor pixel circuit of claim 4, wherein a combination of a spacing between the pair of capacitive deep trench isolation structures and the control voltage sets the barrier of potential.

6. The image sensor pixel circuit of claim 1, wherein the photodiode produces said photogenerated charges for integration during a single integration period.

7. The image sensor pixel circuit of claim 1, wherein said transfer gate transistor circuit comprises:

a memory transfer gate transistor coupled between the charge collection node and a memory node; and a sense transfer gate transistor coupled between the memory node and the sense node.

8. The image sensor pixel circuit of claim 7, further comprising a storage circuit coupled to the memory node.

9. The image sensor pixel circuit of claim 8, wherein the storage circuit is a pinned memory diode circuit.

10. The image sensor pixel circuit of claim 1, further comprising a charge storage circuit coupled to the overflow sense node to store said second charges.

11. The image sensor pixel circuit of claim 10, wherein the charge storage circuit comprises a capacitor.

12. The image sensor pixel circuit of claim 11, wherein said capacitor comprises:

a first capacitor plate formed by a substrate region; and a second capacitor plate formed by a conductive region of a capacitive deep trench isolation structure adjacent said substrate region.

13. The image sensor pixel circuit of claim 1, wherein the read circuitry comprises:

a first source-follower transistor having a gate terminal coupled to the sense node and a source terminal coupled through a first read transistor to a first output line; and a second source-follower transistor having a gate terminal coupled to the overflow sense node and a source terminal coupled through a second read transistor to a second output line.

14. The image sensor pixel circuit of claim 1, wherein the read circuitry comprises:

a first reset transistor coupled between the overflow sense node and the sense node; and a source-follower transistor having a gate terminal coupled to the sense node and a source terminal coupled through a read transistor to an output line.

15. The image sensor pixel circuit of claim 14, further comprising a second reset transistor coupled between the overflow sense node and a reset voltage.

16. The image sensor pixel circuit of claim 15, wherein both the first reset transistor and second reset transistor are simultaneously actuated to reset the overflow sense node and the sense node.

17. The image sensor pixel circuit of claim 15, wherein the first reset transistor is actuated and the second reset transistor is deactuated during read out of the second signal representing the second charges from the overflow sense node.

18. The image sensor pixel circuit of claim 15, wherein both the first reset transistor and second reset transistor are simultaneously deactuated during read out of the first signal representing the first charges from the sense node.

19. An image sensor pixel circuit, comprising:

a photodiode having a charge collection node;

a transfer gate transistor coupled between the charge collection node and a sense node;

an overflow transistor coupled between the charge collection node and an overflow sense node, said overflow transistor presenting a first barrier of potential for passing a first portion of charge from the charge collection node to the overflow sense node; and an anti-blooming transistor coupled between the charge collection node and a supply node, said anti-blooming transistor presenting a second barrier of potential for passing a second portion of charge from the charge collection node to the supply node;

wherein the first barrier of potential is lower than the second barrier of potential.

20. The image sensor pixel circuit of claim 19, wherein the overflow transistor includes a control terminal configured to receive a first control signal for setting the first barrier of potential, and wherein the anti-blooming transistor includes a control terminal configured to receive a second control signal for setting the second barrier of potential.

21. The image sensor pixel circuit of claim 19, further comprising: read circuitry coupled to the sense node and overflow sense node and configured to read out a first signal from the sense node and read out a second signal from the overflow sense node.

22. The image sensor pixel circuit of claim 19, wherein said transfer gate transistor comprises:

a memory transfer gate transistor coupled between the charge collection node and a memory node;

a sense transfer gate transistor coupled between the memory node and the sense node; and a storage circuit coupled to the memory node.

23. The image sensor pixel circuit of claim 22, wherein the storage circuit is a pinned memory diode circuit.

24. The image sensor pixel circuit of claim 19, further comprising a charge storage circuit coupled to the overflow sense node to store said first portion.

25. The image sensor pixel circuit of claim 24, wherein the charge storage circuit comprises a capacitor.

26. A method, comprising:

producing photogenerated charges in response to exposure of a photodiode to light;

collecting the photogenerated charges by integration;

passing a portion of the collected photogenerated charges in excess of a first barrier of potential to an overflow sense node;

passing a remaining portion of the collected photogenerated charges to a sense node;

reading from the overflow sense node a first signal representing the portion of the collected photogenerated charges in excess of the first barrier of potential; and reading from the sense node a second signal representing the remaining portion of the collected photogenerated charges.

27. The method of claim 26, further comprising passing a further portion of the collected photogenerated charges in excess of a second barrier of potential to a supply node; wherein the first barrier of potential is lower than the second barrier of potential.

28. The method of claim 26, wherein reading the first signal comprises:

passing the portion of the collected photogenerated charges from the overflow sense node to said sense node; and reading the first signal from said sense node.

29. The method of claim 26, wherein passing the remaining portion of the collected photogenerated charges comprises:

first passing the remaining portion to a memory node; and second passing the remaining portion from the memory node to the sense node.

* * * * *